(No Model.)
B. F. BERGER & I. SOUSLEY.
WHEEL CULTIVATOR.
No. 369,497. Patented Sept. 6, 1887.
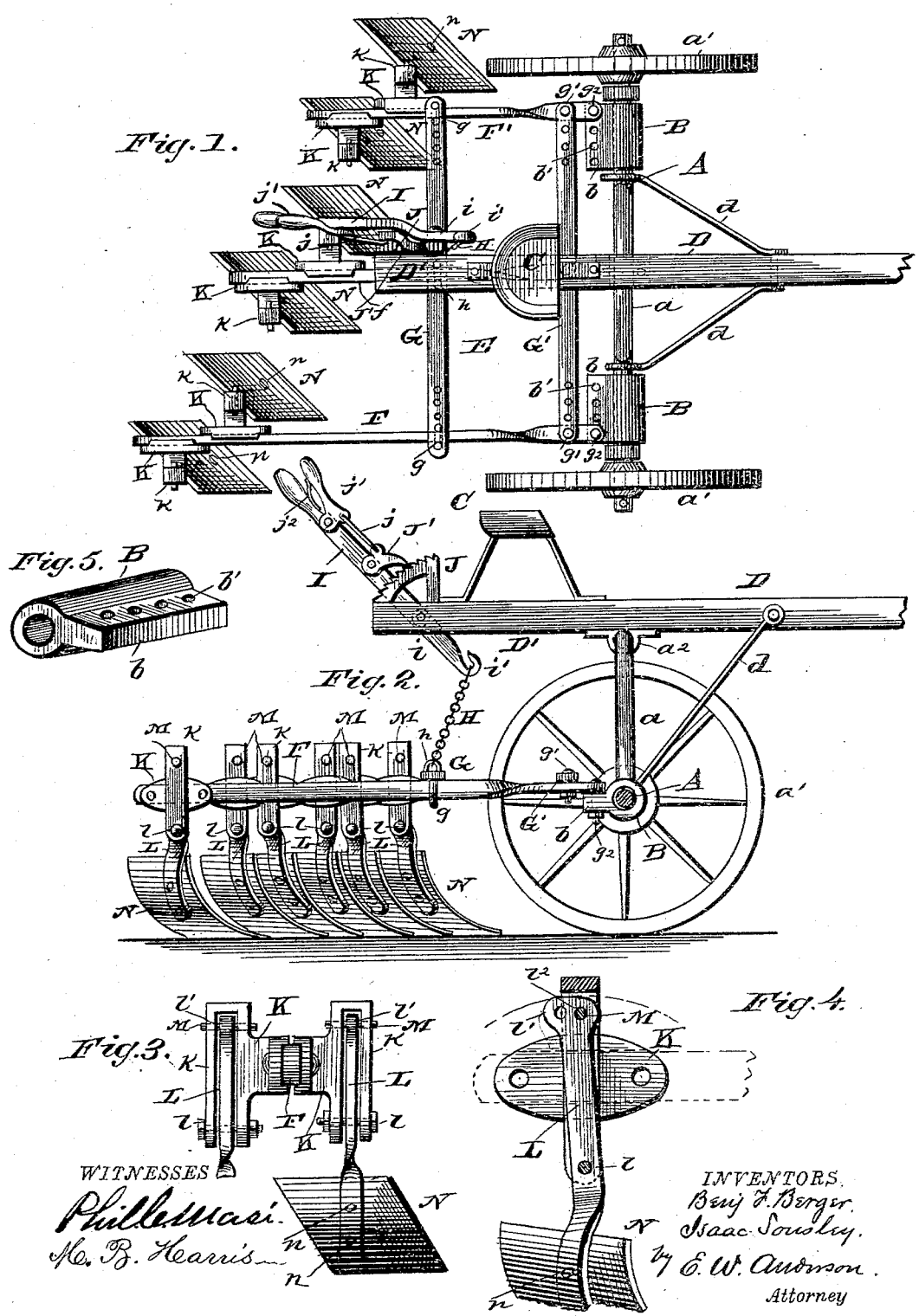
WITNESSES
Phil E Masi
H. B. Harris
INVENTORS
Benj. F. Berger
Isaac Sousley
by E. W. Anderson
Attorney

UNITED STATES PATENT OFFICE.

BENJAMIN F. BERGER AND ISAAC SOUSLEY, OF SOUTH BEND, INDIANA.

WHEEL-CULTIVATOR.

SPECIFICATION forming part of Letters Patent No. 369,497, dated September 6, 1887.

Application filed May 14, 1887. Serial No. 238,232. (No model.)

*To all whom it may concern:*

Be it known that we, BENJAMIN F. BERGER and ISAAC SOUSLEY, citizens of the United States, residing at South Bend, in the county of St. Joseph and State of Indiana, have invented certain new and useful Improvements in Wheel-Cultivators; and we do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of a top or plan view. Fig. 2 is a side elevation. Fig. 3 is a detail end view showing the clamp-brackets. Fig. 4 is a side elevation of the same, partly in section; and Fig. 5 is a detail view of the sleeve.

The invention relates to improvements in cultivators; and it consists in the construction and novel combination of parts, as hereinafter set forth, and illustrated in the drawings.

Referring to the drawings, A designates the axle, having the arch $a$ made centrally upon it and the wheels $a'$ $a'$ journaled and turning loosely on its ends.

B B are sleeves surrounding the axle between the arch $a$ and the wheels on each side, and provided with the rearwardly-extending approximate flanges $b$ $b$, having the series of adjusting-openings $b'$ $b'$.

C is the driver's seat, secured on standards rising from the rear portion of the tongue D at a point that throws the weight of the driver about vertically upon the axle. The tongue D is connected to the axle A by the brace-rods $d$ $d$ on each side, which prevent the tongue turning on the arch of the axle, the bearing $a^2$ of which is secured to the under side of the tongue.

E is the cultivator-frame, in rear of the axle A, and composed of the side bars, F F', of different lengths, and any desired number of intermediate bars, $f$ $f$, and the transverse bars G G', to hold the longitudinal bars together.

The longitudinal side bars, F F', pass through staples $g$ on the rear transverse bar, G, and are pivoted near their front end at $g'$ on the front transverse bar, G', the said ends in front of the bar G being pivoted by detachable pins $g^2$ $g^2$ in the openings $b'$ $b'$, so that the rear end of the side bars, F F', may be adjusted toward or from each other.

The central longitudinal bar, $f$, of the cultivator-frame E has a loop or staple, $h$, secured to it, which staple is connected by a chain, H, with the hook $i'$ on the end of the rear arm, $i$, of the lever I, pivoted upon the rearward extension, D', of the tongue D concentric with the upright curved rack J, secured upon said extension.

The upper arm or handle of the lever I has affixed to it the pawl J', the link-bar $j$, and the spring-controlled hand-lever $j'$, the spring $j^2$ of which forces the pawl J' into engagement with the rack J. By means of the said lever I, rack-bar J, pawl J', link $j$, and hand-lever $j'$ the cultivator-frame may be lifted by the driver in relation to the seat and tongue when turning or driving to a field.

Each longitudinal bar F, F', and $f$ has attached at its central portion the two clamp-brackets K K, one of which is adjacent to its end on one side thereof, and the other forward and on the opposite side from the former. Each of the said clamp-brackets has depending from it the bifurcated arm $k$, between the legs of which the standard L of the cultivator-blade is pivoted. The said standard is pivoted at $l$ between the ends of the legs of the corresponding arm $k$, and has at its upper end the head $l'$, provided with a series of adjusting-openings, $l^2$, concentric with the pivotal point $l$, by means of which openings and the openings $l^3$ in the legs of the arm $k$ the standard L can be set at different angles to the said arm, a pin, M, of wood or other material easily fractured, being used to connect the said parts together.

N N are the cultivator-blades, each having a trapezium-shaped contour and provided with an upper and lower cutting-edge, the bolt-holes $n$ $n$ being situated at such points that the blade can be secured to the standard with either edge down, so that when one edge is worn the other edge can be placed downward.

By means of the standards having the series of openings in their heads the points of the cultivator-blades can be set to enter more or less deeply into the soil, and should a blade meet an obstruction the wooden pin will break under the shock or pressure and allow the blade to swing back without being injured. By the described construction, therefore, the blades can be reversed or set at different angles to the soil, the standards can be turned backward should the blades meet with any unusual obstruction, the cultivator-frame can be raised when turning, and the blades of the said frame be set farther apart or nearer together, according to the width of the rows.

Having described our invention, we claim—

1. The cultivator-frame composed of the bars F F' and one or more intermediate bars of graduated length to bring the attached plows in oblique line, and the adjusting cross-bars G G', said side bars having a quarter-twist to adapt them to the coupling-sleeves B, and the standard-brackets K, substantially as specified.

2. The cultivator-frame, adjustable as described, in combination with the bifurcated brackets K, yielding standards L, with adjusting-holes, coupling-sleeves B, arched axle a, tongue D, and lifting-lever H I, substantially as specified.

In testimony whereof we affix our signatures in presence of two witnesses.

BENJAMIN F. BERGER.
ISAAC SOUSLEY.

Witnesses:
A. S. MILBOURN,
WILLIAM BENNETT.